(12) United States Patent
Boutaghou et al.

(10) Patent No.: US 6,760,197 B2
(45) Date of Patent: Jul. 6, 2004

(54) LAPPING SENSOR FOR RECORDING HEADS HAVING GUIDE ELEMENT KEPT

(75) Inventors: Zine-Eddine Boutaghou, Vadnais Height, MN (US); Edward Stephens Murdock, Edina, MN (US)

(73) Assignee: Seagate Technology LLC, Scotts Valley, CA (US)

(*) Notice: Subject to any disclaimer, the term of this patent is extended or adjusted under 35 U.S.C. 154(b) by 79 days.

(21) Appl. No.: 09/865,334

(22) Filed: May 25, 2001

(65) Prior Publication Data

US 2002/0012204 A1 Jan. 31, 2002

Related U.S. Application Data

(60) Provisional application No. 60/207,465, filed on May 25, 2000.

(51) Int. Cl.$^7$ ................................................ G11B 5/33
(52) U.S. Cl. ............................................................ 360/316
(58) Field of Search ................................ 360/316, 314, 360/315, 327.32; 29/603.09, 603.01, 603.15; 235/449; 257/25; 33/567

(56) References Cited

U.S. PATENT DOCUMENTS

| | | | |
|---|---|---|---|
| 3,821,815 A | 6/1974 | Abbott et al. | 360/316 |
| 3,903,653 A | 9/1975 | Imhoff et al. | 51/59 R |
| 4,433,510 A | 2/1984 | Katagiri et al. | 61/165 R |
| 4,816,947 A | 3/1989 | Vinal et al. | 360/316 |
| 5,065,483 A * | 11/1991 | Zammit | 29/603.09 |
| 5,175,938 A * | 1/1993 | Smith | 33/567 |
| 5,333,413 A | 8/1994 | Hashimoto | 51/165.75 |
| 5,378,885 A * | 1/1995 | Jones et al. | 235/449 |
| 5,381,291 A | 1/1995 | Madsen et al. | 360/113 |
| 5,463,805 A * | 11/1995 | Mowry et al. | 29/603.09 |
| 5,494,473 A | 2/1996 | Dupuis et al. | 451/1 |
| 5,559,429 A | 9/1996 | Mowry et al. | 324/71.5 |
| 5,588,199 A | 12/1996 | Krounbi et al. | 29/603.1 |

(List continued on next page.)

FOREIGN PATENT DOCUMENTS

| | | |
|---|---|---|
| JP | 60043215 | 3/1985 |
| JP | 60202513 | 10/1985 |
| JP | 10105908 | 4/1998 |
| JP | 11273016 | 10/1999 |
| JP | 2000067408 A * | 3/2000 ........... G11B/5/127 |

OTHER PUBLICATIONS

Rohen, J., "Electrostatic Shielding for Magnetoresistive Read Heads", *IBM® Technical Disclosure Bulletin*, vol. 21, No. 11, 1 page (Apr. 1, 1979).

"Using Magneto–Resistive Head Transducers as Lapping Transducers and a Parallel Resistor System to Calculate Lapping Constants", *IBM® Technical Disclosure Bulletin*, vol. 36, No. 09A, pp. 79–81 (Sep. 1, 1993).

*Primary Examiner*—Tianjie Chen
(74) *Attorney, Agent, or Firm*—Merchant & Gould P.C.

(57) ABSTRACT

Herein is disclosed a method and apparatus for controlling a lapping process, so as to create a read/write head that contains a primary magnetoresistive read element with a desired stripe height. An improved lapping guide is achieved by incorporating a secondary magnetoresistive element into a read/write head. By virtue of its location on the same read/write head as a primary magnetoresistive element (used for reading data during operation of the disc drive), the secondary element is located in close proximity to the primary element, resulting in smaller tolerances in aligning or relating the top edges of the primary and secondary elements. Accordingly, the secondary magnetoresistive element more reliably serves as a proxy for the primary element. Optionally, the secondary magnetoresistive element may be fashioned with identical dimensions as the primary element, so as to render the secondary element equivalent to the primary element with regard to magnetic sensitivity. During lapping, the magnetic sensitivity of the secondary magnetoresistive element is monitored and used as a proxy measurement of the magnetic sensitivity of the primary magnetoresistive read element.

20 Claims, 9 Drawing Sheets

U.S. PATENT DOCUMENTS

| | | | |
|---|---|---|---|
| 5,669,133 A | 9/1997 | George | 29/603.16 |
| 5,742,995 A | 4/1998 | Amin et al. | 29/603.1 |
| 5,772,493 A | 6/1998 | Rottmayer et al. | 451/5 |
| 5,973,334 A * | 10/1999 | Mizushima et al. | 257/25 |
| 5,996,213 A * | 12/1999 | Shen et al. | 29/603.15 |
| 5,997,381 A | 12/1999 | Dee et al. | 451/5 |
| 6,003,361 A | 12/1999 | Amin et al. | 73/7 |
| 6,007,405 A | 12/1999 | Mei | 451/5 |
| 6,083,081 A | 7/2000 | Fukuroi et al. | 451/5 |
| 6,093,083 A | 7/2000 | Lackey | 451/28 |
| 6,111,406 A | 8/2000 | Garfunkel et al. | 324/210 |
| 6,117,569 A | 9/2000 | Lin et al. | 428/692 |
| 6,127,053 A | 10/2000 | Lin et al. | 428/692 |
| 6,128,423 A | 10/2000 | Shirai | 385/12 |
| 6,193,584 B1 | 2/2001 | Rudy et al. | 451/5 |
| 6,210,259 B1 | 4/2001 | Malkin et al. | 451/166 |
| 6,219,205 B1 | 4/2001 | Yuan et al. | 360/319 |
| 6,317,302 B1 * | 11/2001 | Van Kesteren et al. | 360/327.32 |

* cited by examiner

LAPPING SENSOR FOR RECORDING HEADS HAVING GUIDE ELEMENT KEPT

RELATED APPLICATIONS

This application claims the benefit of the filing date of U.S. Provisional Patent Application Ser. No. 60/207,465 filed May 25, 2000 and entitled "IMPROVED LAPPING SENSOR FOR RECORDING HEADS."

FIELD OF THE INVENTION

This application relates to hard disc drives and more particularly to an apparatus and method for controlling a lapping process, so as to create a read/write head that contains a primary magnetoresistive read element with a desired stripe height.

BACKGROUND OF THE INVENTION

The storage medium for a disc drive is a flat, circular disc capable of retaining localized magnetic fields. The data that are stored upon the disc find physical representation through these localized magnetic fields. The data are arranged on the disc in concentric, circular paths known as tracks.

The localized magnetic fields can be detected by a magnetically sensitive head when they are brought in close proximity to the head. During operation, the disc continually rotates, meaning that for each rotation, a head fixed a given radius from the center of the disc would encounter every localized magnetic field along a given track.

A read/write head 100 capable of reading and writing localized magnetic fields upon the surface of a disc is depicted in FIG. 1. The read/write head 100 depicted in FIG. 1 is constructed from a body 102 composed of AlTiC (Aluminum, Titanium and Carbide) wafer material. Conjoined to the body 102 is a magnetoresistive read element and a write element, shown jointly as 104. The resistance of the magnetoresistive read element 104 changes when introduced to a magnetic field. Generally, the greater the magnetic field in which the magnetoresistive read element 104 is immersed, the higher its resistance. Accordingly, the magnetoresistive read element 104 is used to detect a localized magnetic field stored on the surface of the disc by orienting the localized magnetic field under the read element 104 and observing a change in the element's 104 resistance.

To detect a change in the resistance of the read element 104, a constant current is passed through the magnetoresistive read element 104 and the voltage across the element 104 is observed. As the resistance of the element 104 increases due to the influence of a proximate magnetic field, the voltage across the element 104 increases proportionately. Thus, the change in resistance is observed as a corresponding rise in voltage across the read element 104. The constant current used to detect the localized magnetic fields is propagated through conductors 106, 108, which electrically contact opposite ends of the magnetoresistive element 104. The conductors 106, 108 run to a pair of wire bonds 110, 112, which join the conductors 106, 108 to a pair of elongated conductors 114, 116 that extend the length of the head 100, and join to detection circuitry (not pictured). The read/write head 100 also contains conductors 118, 120 through which a current is passed to record a magnetic field upon the surface of the disc. Conductors 118, 120 also run to a pair of wire bonds 122, 124, which join the conductors 118, 120 to a pair of elongated conductors 126, 128 that extend the length of the head 100, and join to writing circuitry (not pictured).

FIG. 2 shows a magnified view of a magnetoresistive read element 104. As can be seen from FIG. 2, the bottom edge 200 of the magnetoresistive read element 104 extends to the air bearing surface of the slider. The air bearing surface functions to create a "cushion" of air upon which the read/write head 100 floats as it is positioned over a rotating disc.

The top edge of the magnetoresistive read element 104 is identified by reference numeral 204. The distance between the bottom edge 200 and the top edge 204 of the magnetoresistive read element 104 is referred to as the "stripe height." The stripe height of a magnetoresistive read element is an important variable, as it determines the sensitivity of the magnetoresistive element to a magnetic field. Generally, the shorter the stripe height, the more sensitive the magnetoresistive element, and vice versa.

As shown by FIG. 3, prior to processing, a magnetoresistive read element 104 has a stripe height on the order of 100,000 Å. The conductors 106, 108 have approximately the same height. During manufacture, the magnetoresistive head is "lapped," thereby reducing the magnetoresistive read element's 104 stripe height to that which is shown in FIG. 2, on the order of 500 Å (with a typical tolerance of ±10%), depending upon product requirements. "Lapping" is a term used to describe a grinding process in which the magnetoresistive read element 104 and its associated conductors 106, 108 are literally ground down by an abrasive slurry, until the desired stripe height is achieved. The purpose of the lapping process is to reduce the stripe height of the magnetoresistive read element until the proper magnetic sensitivity has been created.

Ideally, it would be possible to directly test the sensitivity of the magnetoresistive read element during lapping, so that when the proper sensitivity had been achieved, lapping could be ceased. Unfortunately, by passing an electrical signal through the magnetoresistive read element, as is necessary in order to directly test the read element's resistance, the likelihood of an electrostatic discharge between the magnetoresistive read element and the abrasive slurry is enhanced. Such an electrostatic discharge is harmful to the read element, and it is therefore desirable to minimize the likelihood of such a discharge.

It is known in the art that, during lapping, the resistance of a secondary resistive element can be monitored and used as a proxy for directly measuring the stripe height of a primary magnetoresistive element. When the resistance of the secondary magnetoresistive element reaches a predetermined level, it can be assumed that the stripe height of the primary magnetoresistive element is in its appropriate range, and lapping can be ceased. In order to use such a measurement-by-proxy scheme, the primary and secondary elements should be arranged so that there exists a known relationship between the sensitivity of the primary and secondary elements.

FIG. 4 shows an undiced, untapped wafer 400 containing two read/write heads 402, 404 and a lapping guide 406. Read/write head 402 contains a primary magnetoresistive element 408, and lapping guide 406 contains a secondary resistive element 410, the resistance of which is in known relation to magnetoresistive element 408. During lapping, the resistance of the secondary resistive element 410 is monitored. When the resistance of the secondary resistive element 410 reaches a certain level, it is assumed that the stripe height of the primary magnetoresistive element 408 is in its appropriate range, and lapping is ceased. To ensure that the resistance of the secondary resistive element 410 is in known relation to the stripe hieght of the primary magnetoresistive element 408, the top edges of the primary and secondary elements are aligned. Therefore, during lapping, the stripe height of the primary and secondary elements should be equivalent, and the resistance of the secondary element should serve as a suitable proxy for the stripe height of the primary element. This solution, which is known in the art, has problems, however. The distance between the primary and secondary elements 408, 410 is relatively great (perhaps 500 microns). Because of this great distance, the alignment of the top edges of the primary 408 and secondary elements 410 necessarily has a wide tolerance. Such a wide tolerance is undesirable, because it detracts from the accuracy with which the secondary resistive element 410 indicates the stripe height of the primary element 408. Thus, the secondary resistive element 410 is an unreliable proxy for the primary magnetoresistive element 408. Accordingly there exists a need for a means for accurately measuring and controlling the stripe height of a primary magnetoresistive element without subjecting the element to the risk of damage from electrostatic discharge.

SUMMARY OF THE INVENTION

The method and apparatus in accordance with the present invention solves the aforementioned problems and other problems by an apparatus or method as presented herein. The method involves grounding a primary magnetoresistive read element located on the read/write head to be lapped. Next, a test signal is passed through a secondary magnetoresistive read element that is also located on the read/write head. Lapping of the primary and secondary magnetoresistive elements is commenced. The lapping is continued until the test signal exhibits a desired characteristic.

Another aspect of the invention includes a read/write head with a primary magnetoresistive read element (used for reading data during operation of the disc drive into which the read/write head is palced). The read/write head also includes a secondary magnetoresistive read element, dimensioned in proportion to the primary magnetoresistive read element and positioned in proximity thereto.

These and various other features as well as advantages which characterize the present invention will be apparent from a reading of the following detailed description and a review of the associated drawings.

DETAILED DESCRIPTION

An improved lapping guide is achieved by incorporating a secondary magnetoresistive element into a read/write head. By virtue of its location on the same read/write head as a primary magnetoresistive element (used for reading data during operation of the disc drive), the secondary element is located in close proximity to the primary element, resulting in smaller tolerances in aligning or relating the top edges of the primary and secondary elements. Accordingly, the secondary magnetoresistive element more reliably serves as a proxy for the primary element. Optionally, the secondary magnetoresistive element may be fashioned with identical dimensions as the primary element, so as to render the secondary element equivalent to the primary element with regard to magnetic sensitivity.

Figure 1:
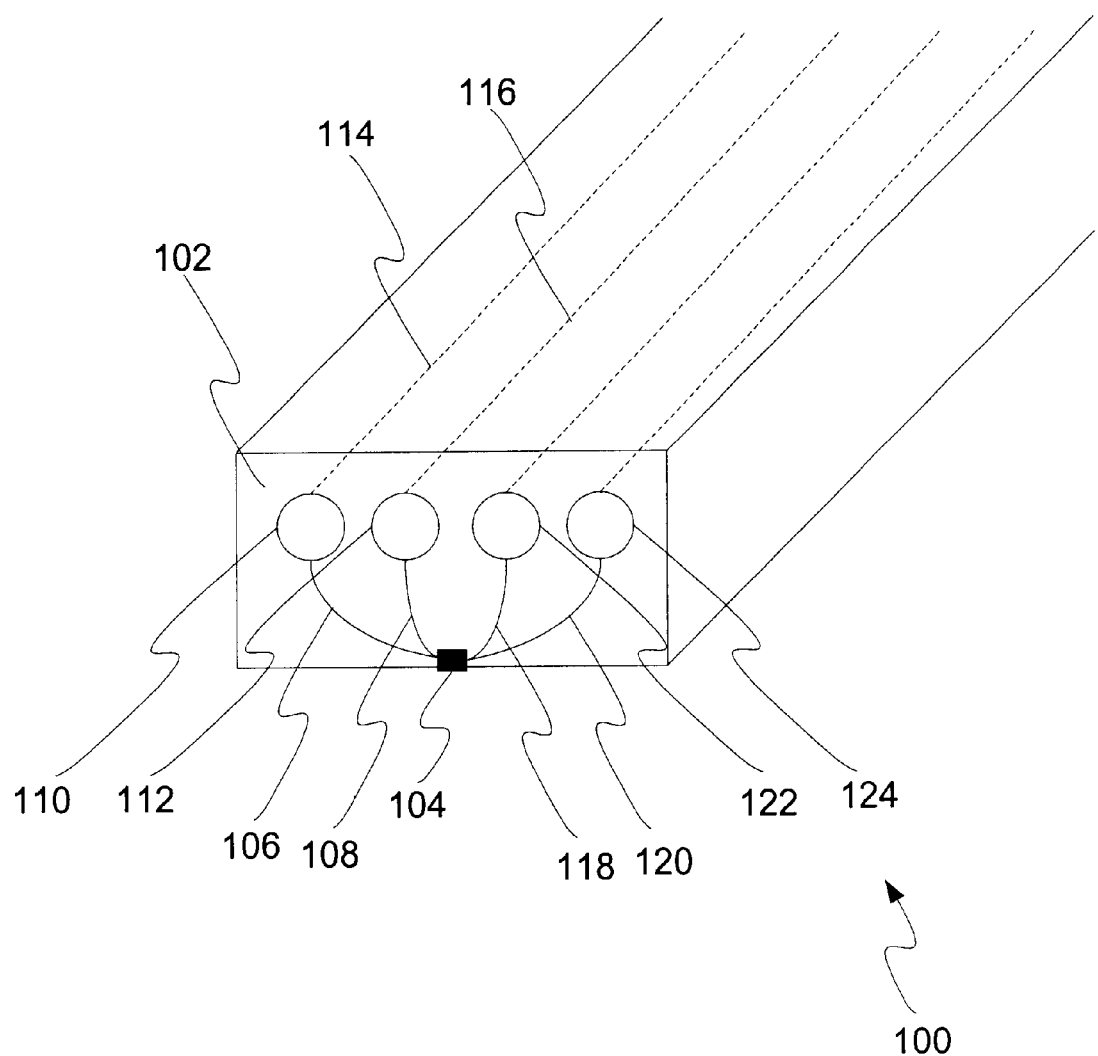
FIG. 1 depicts a read/write head known in the prior art.
Figure 2:
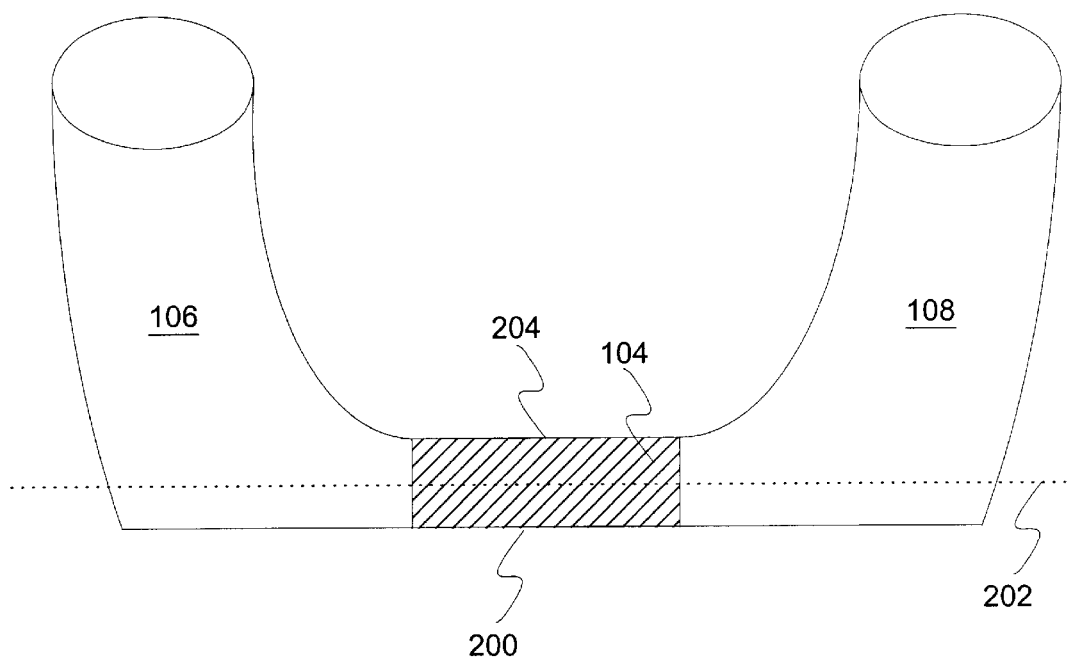
FIG. 2 depicts a magnified view of a magnetoresistive read element after lapping.
Figure 3:
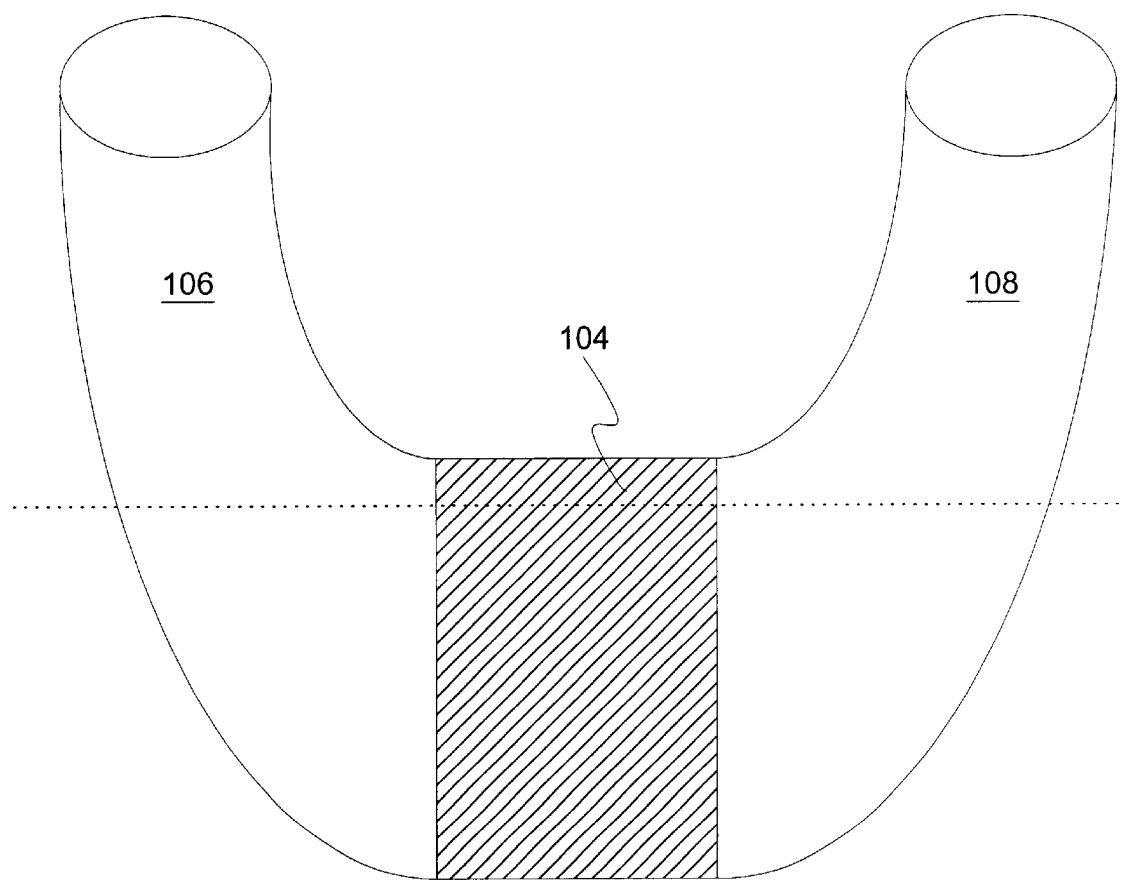
FIG. 3 depicts a magnified view of a magnetoresistive read element prior to lapping.
Figure 4:
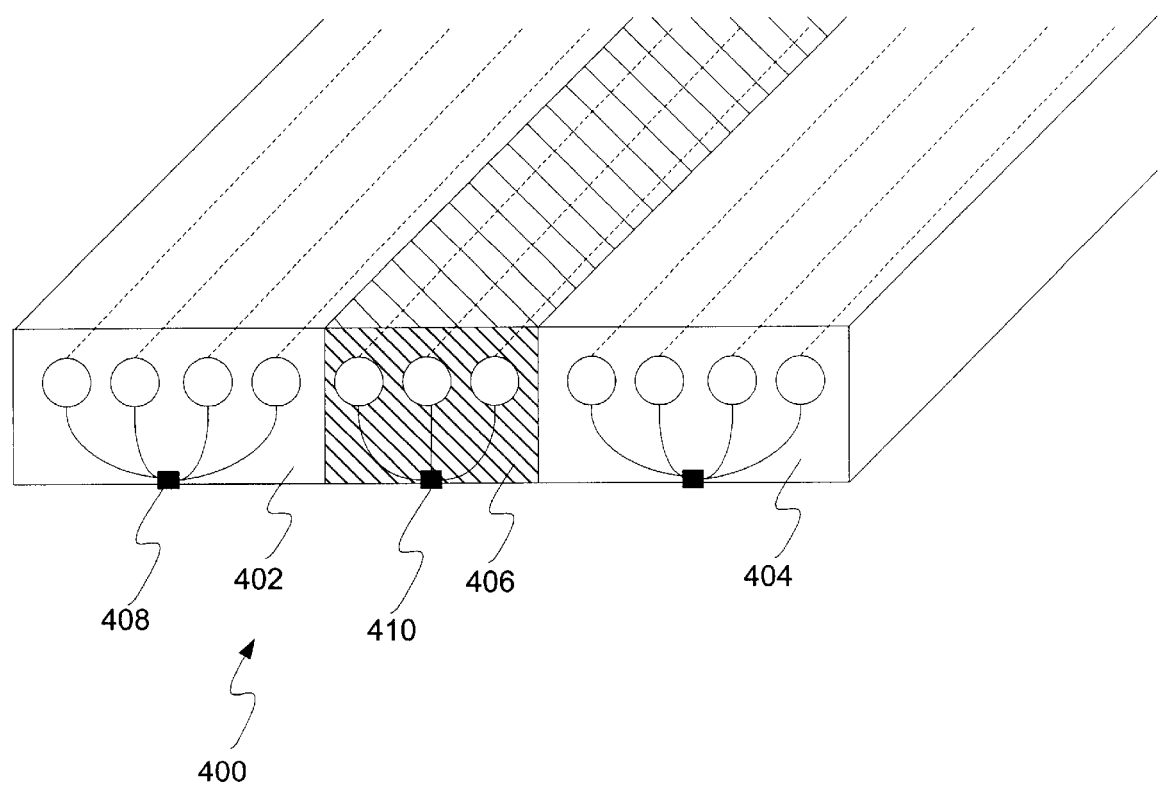
FIG. 4 depicts an undiced, unlapped wafer containing two read/write heads and a lapping guide.
Figure 5:
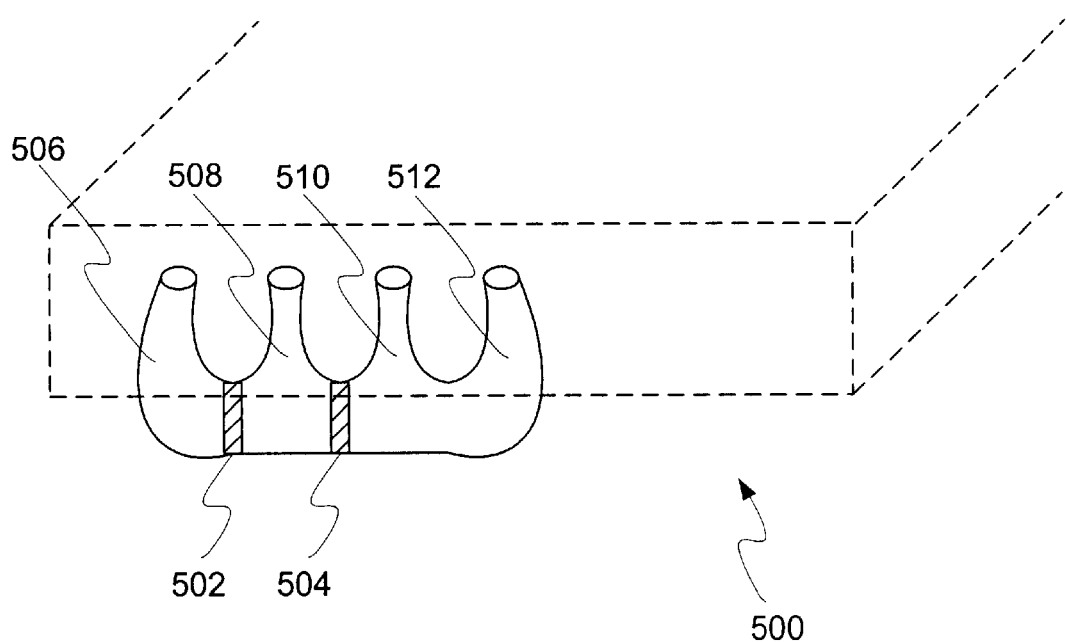
FIG. 5 depicts an unlapped read/write head in accordance with one embodiment of the present invention.

FIG. 5 depicts an unlapped read/write head 500 in accordance with one embodiment of the present invention. As can be seen from FIG. 5, the read/write head 500 has a primary magnetoresistive read element 502 and a secondary magnetoresistive element 504. The primary magnetoresistive read element 502 is interposed between two conductors 506, 508. The secondary magnetoresistive element 504 is also interposed between two conductors 508, 510. The primary magnetoresistive read element 502 and the secondary magnetoresistive element 504 share one conductor 508. The primary magnetoresistive read element 502 and the secondary magnetoresistive element 504 have their top edges aligned in a collinear fashion. In an alternate embodiment, their respective top edges are in any other known relation to each other. A third pair of conductors 510, 512 directly contact each other, with one of the conductors 510 being shared with the secondary magnetoresistive element 504.

During lapping, a test signal may be passed through conductor 508, secondary magnetoresistive read element 504, and conductor 510. The resulting voltage between conductor 508 and conductor 510 is representative of the voltage that would be detected if the same operation were performed upon the primary magnetoresistive read element 502. If secondary magnetoresistive element 504 is fashioned identically to the primary magnetoresistive read element 502, and if conductor 510 is fashioned identically to conductor 506, then that voltage is the same. The voltage so detected is representative of the resistance of the conductors 508, 510, the resistance of the secondary magnetoresistive element 504, and the resistance found in the junctions between the conductors 508, 510 and the secondary element 504. Lapping can be ceased when the voltage between conductors 508 and 510 reaches a predetermined threshold, indicating that the primary magnetoresistive read element 502 has been lapped to the proper stripe height.

A current may be passed through conductors 510 and 512. The resulting voltage between the conductors 510 and 512 is representative of their combined resistances. If the conductors 510, 512 are fashioned identically to the conductors 506, 508 surrounding the primary magnetoresistive read element 502, the voltage so developed is indicative of the resistance of those conductors 506, 508. Thus, the voltage between conductors 506 and 508 may be subtracted from the voltage between conductors 508 and 510 to negate the effect of conductor resistance. By so doing, the resistance of the magnetoresistive element 504 itself (without the added resitance of the conductors 508, 510) can be the determining factor in the cessation of lapping. Lapping can be ceased when the aforedescribed difference reaches a predetermined threshold, indicating that the primary magnetoresistive read element 502 has been lapped to the proper stripe height.

Figure 6:
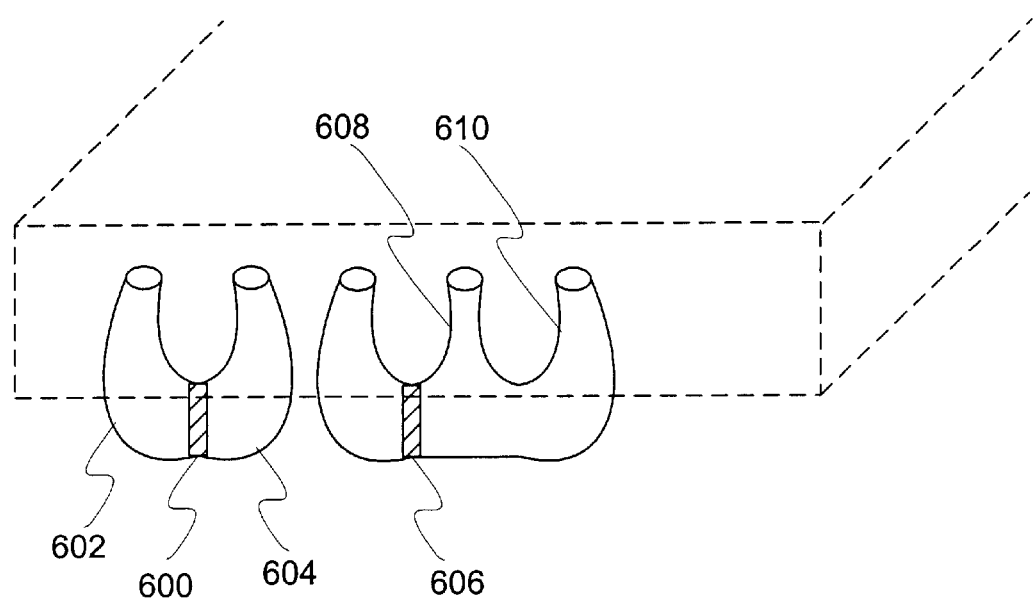
FIG. 6 depicts an unlapped read/write head in accordance with another embodiment of the present invention.

FIG. 6 depicts an embodiment of the present invention in which the primary magnetoresistive read element 600 is interposed between two conductors 602, 604, neither of which are shared by the secondary magnetoresistive element 606 or the pair of conductors 608, 610, used to account for conductor resistance. By isolating the primary magnetoresistive read element 600, its capacitance is reduced, thereby enhancing its bandwidth.

Figure 7:
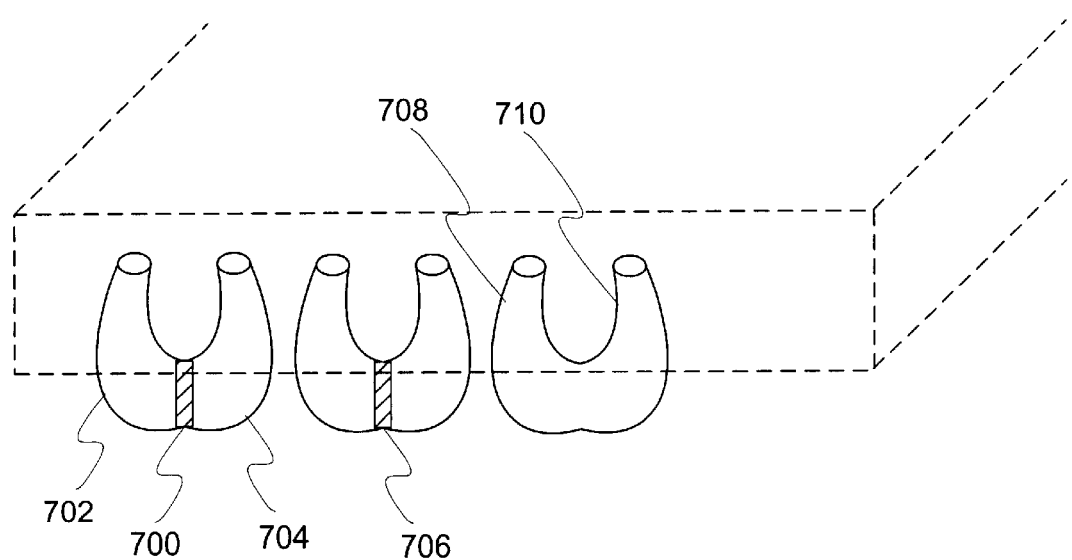
FIG. 7 depicts an unlapped read/write head in accordance with another embodiment of the present invention.

FIG. 7 depicts another embodiment of the present invention in which the primary magnetoresistive read element 700 is interposed between two conductors 702, 704, neither of which are shared by the secondary magnetoresistive element 706 or the pair of conductors 708, 710, used to account for conductor resistance. In this embodiment, the secondary element 706 is isolated, as are conductors 708 and 710. The benefit of isolating the primary magnetoresistive read element 700 and the secondary magnetoresistive element 706 is that the geometries of their respective conductor-element-conductor circuits can be fashioned identically.

Figure 8:
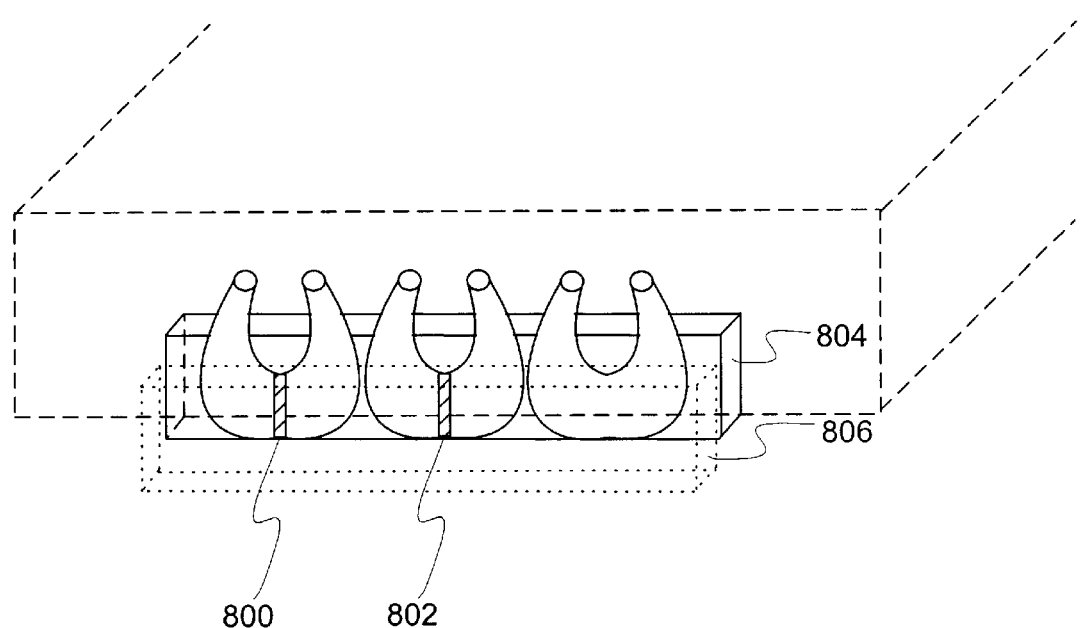
FIG. 8 depicts an unlapped read/write head in accordance with another embodiment of the present invention.

FIG. 8 depicts another embodiment of the present invention. In FIG. 8, the primary magnetoresistive read element 800, the secondary magnetoresistive element 802 and each of the conductors are located between two magnetic shields 804, 806. Magnetic shield 806 has been depicted with dotted lines to indicate that it has been cut away to permit viewing of the magnetoresistive elements 800, 802 lying behind it. The shields 804, 806 protect the magnetoresistive elements 800, 802 from the influence of stray magnetic fields. By disposing both the primary magnetoresistive element 800 and the secondary magnetoresistive element 802 upon the shield 804, alignment of their respective top edges is rendered more accurate. The enhanced accuracy stems from the fact that the primary and secondary elements are disposed upon the same planar surface, presenting a uniform optical arrangement for photolithography. Although FIG. 8 depicts the shields 804, 806 used in conjunction with the embodiment of the invention shown in FIG. 7, the shields 804, 806 may be used in conjunction with the embodiments of the invention shown in FIGS. 5 and 6, as well.

Figure 9:
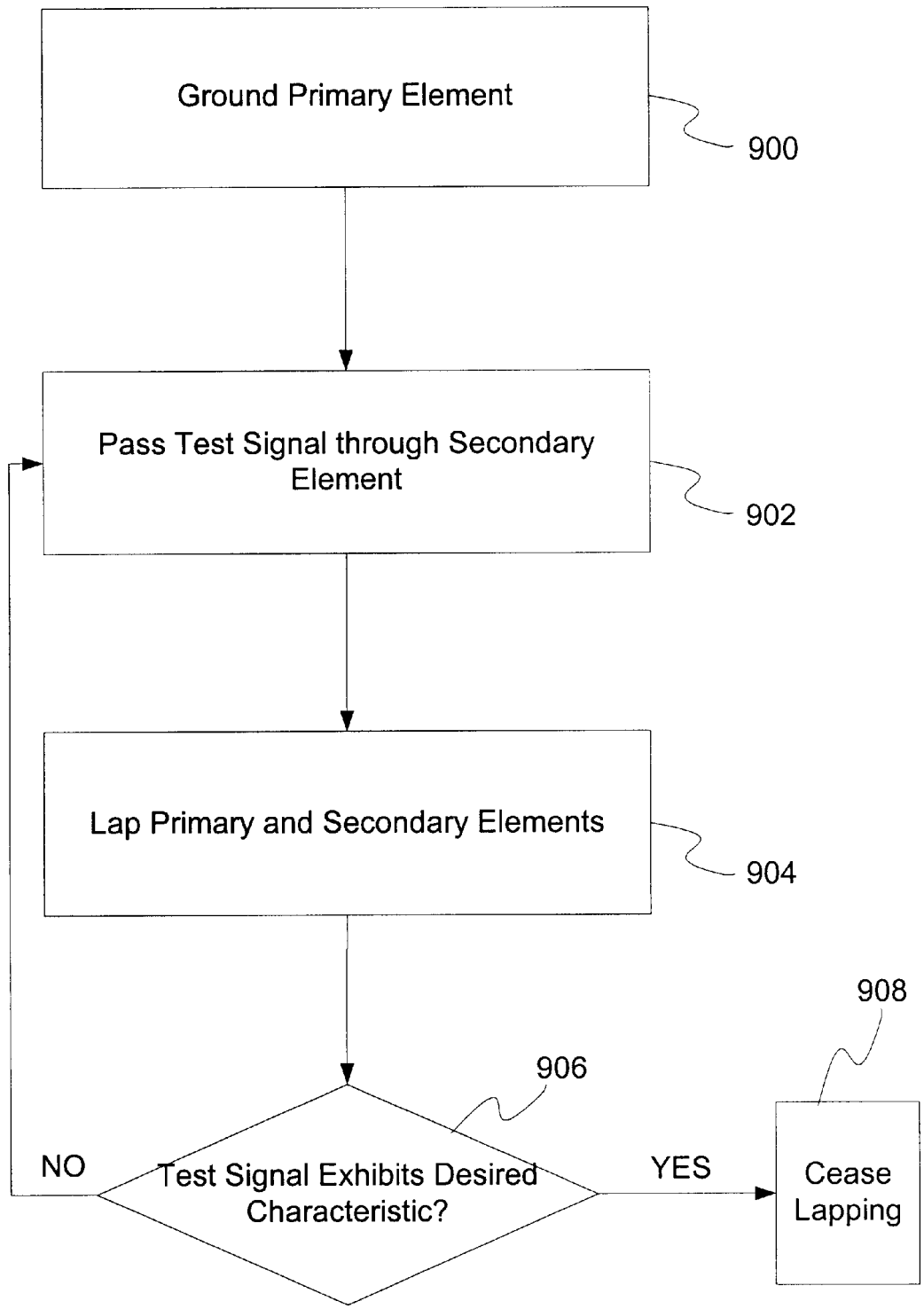
FIG. 9 depicts a method of controlling a lapping process used in conjunction with the embodiments depicted in FIGS. 5 through 8.

The embodiments of the invention depicted in FIGS. 5–8 may be used in conjunction with the method described in FIG. 9. The method described with reference to FIG. 9 may be implemented by an automated test system. The functionality described with reference to FIG. 9 may be embodied in the circuitry of laboratory equipment (such as a digital multimeter or an oscilloscope) and may also be embodied in software residing on a computer that controls such laboratory equipment.

The general structure of the method used in conjunction with the embodiments depicted in FIGS. 5–8 is shown in FIG. 9. As can be seen from FIG. 9, the method begins with operation 900, in which the conductors surrounding the primary magnetoresistive read element are grounded, so as to minimize the chance of an electrostatic discharge between the primary read element and the slurry during lapping. Next, in test operation 902, a test signal is passed through the secondary magnetoresistive element, and lapping is commenced in operation 904. In query operation 906, it is determined whether or not the test signal exhibits one or more desired characteristics indicating that the proper stripe height has been achieved. If the test signal does not yet exhibit the one or more desired characteristics, flow is returned to operation 902, so that lapping and testing continue. Otherwise, lapping ceases, as shown in operation 908. Test operation 902 and query operation 906 can be embodied by various steps, as described below.

In one embodiment, test operation 902 comprises passing a signal of known voltage through the secondary magnetoresistive element. As lapping progresses, the resistance of the primary magnetoresistive element and the secondary magnetoresistive element is increased (because the stripe height is decreased, leaving a smaller cross-sectional area for electrical current to travel through), resulting in a progressively diminishing current. Therefore, in this embodiment, query operation 906 comprises determining whether the test signal is reduced to a desired amperage level.

Similarly, in another embodiment, test operation 902 comprises passing a signal of known amperage through the secondary magnetoresistive element. Once again, as lapping progresses, the resistance of the primary magnetoresistive element and the secondary magnetoresistive element is increased, resulting in a progressively increasing voltage across the secondary magnetoresistive element. Therefore, in this embodiment, query operation 906 comprises determining whether the test signal reaches a desired voltage level.

In yet another embodiment, test operation 902 comprises exposing the secondary magnetoresistive element to a dynamic magnetic field and passing a signal of known electrical current through said element. In this embodiment, the resistance of the secondary magnetoresistive element is a function of both the magnetic field to which it is exposed and the stripe height to which it is presently reduced. Thus, query operation 906 comprises determining whether the test signal reaches a desired voltage level as measured by its root-mean-square value (RMS). Alternatively, test operation 902 can comprise exposing the secondary magnetoresistive element to a dynamic magnetic field and passing a signal of known voltage through said element. Accordingly, query operation 906 comprises determining whether the test signal is reduced to a desired level of electrical current as measured by its RMS value.

In yet another embodiment, test operation 902 comprises exposing the secondary magnetoresistive element to a dynamic magnetic field and passing a direct current (DC) signal through the secondary magnetoresistive element. In this embodiment, query operation 906 comprises determining whether the test signal possesses a voltage profile (voltage plotted against time) with no DC offset. Alternatively, query operation 906 can comprise determining whether the test signal possesses a current profile (amperage plotted against time) with no DC offset.

In yet another embodiment, test operation 902 comprises passing a signal of known voltage through the secondary magnetoresistive element. In this embodiment, query operation 906 comprises seeking a thermal asperity by determining whether the test signal drops below a predetermined level of electrical current. Alternatively, test operation 902 comprises passing a signal of known amperage through the secondary magnetoresistive element. Accordingly, query operation 906 comprises seeking a thermal asperity by determining whether the test signal voltage rises above a predetermined threshold voltage.

In yet another embodiment, test operation 902 comprises passing an electrical current through a pair of conductors used for negating the effect of conductor resistance, and also comprises passing a signal of known electrical current through the secondary magnetoresistive element. In this embodiment, query operation 906 comprises determining whether the difference between the voltage across the secondary magnetoresistive element and the voltage across the pair of conductors exceeds a threshold voltage.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

The claimed invention is:

1. A single channel read/write head for use in a disc drive, the read/write head comprising:
   a first magnetoresistive read element; and
   a second magnetoresistive read element, dimensioned in proportion to the first magnetoresistive read element and positioned in proximity to the first magnetoresistive read element, wherein the first and second magnetoresistive read elements reside on the same read/write head and the second magnetoresistive read element is used as a proxy during lapping.

2. The read/write head of claim 1, wherein the second magnetoresistive read element is the same size as the first magnetoresistive read element.

3. The read/write head of claim 1, wherein the first and second magnetoresistive read elements each possess a top edge, and wherein the top edges of the first and second magnetoresistive read elements are collinear.

4. The read/write head of claim 1, wherein the first magnetoresistive read element is interposed between a first pair of conductors, and wherein the second magnetoresistive read element is interposed between a second pair of conductors, the first and second pairs of conductors being dimensioned so as to have approximately identical impedances.

5. The read/write head of claim 4, wherein the first pair of conductors comprises a first conductor and a second conductor, and wherein the second pair of conductors comprises the second conductor and a third conductor.

6. The read/write head of claim 4, further comprising a third pair of conductors, the third pair of conductors being in electrical contact with each other and being dimensioned to as to have approximately identical impedances as the first and second pairs of conductors.

7. The read/write head of claim 6, wherein the first pair of conductors comprises a first conductor and a second conductor, and wherein the third pair of conductors comprises the second conductor and a third conductor.

8. The read/write head of claim 1, further comprising:
   a first magnetic shield; and
   a second magnetic shield, wherein the the first and second magnetoresistive elements are oriented between the first and second magnetic shields.

9. The read/write head of claim 1, further comprising:
   a magnetoresistive shield, wherein the the first and second magnetoresistive elements are disposed upon the magnetoresistive shield.

10. A read/write head for use in a disc drive, the read/write head comprising:
    a first magnetoresistive read element having electrical properties; and
    a means for determining by proxy the electrical properties of the first magnetoresistive read element, wherein said means for determining is arranged and configured on the read/write head on which the first magnetoresistive read element is conjoined and remains in proximity with the first magnetoresistive read element after dicing.

11. The read/write head of claim 10 wherein the means for determining includes a second magnetoresistive read element positioned in proximity to the first magnetoresistive read element.

12. The read/write head of claim 11 wherein the second magnetoresistive read element is dimensioned in proportion to the first magnetoresistive read element.

13. The read/write head of claim 11 wherein the first and second magnetoresistive read elements each possess a top edge, and wherein the top edges of the first and second magnetoresistive read elements are collinear.

14. The read/write head of claim 11 wherein the first magnetoresistive read element is interposed between a first pair of conductors, and wherein the second magnetoresistive read element is interposed between a second pair of conductors, the first and second pairs of conductors being dimensioned so as to have approximately identical impedances.

15. The read/write head of claim 11 wherein the second magnetoresistive read element is the same size as the first magnetoresistive read element.

16. A method of determining by proxy electrical properties of a magnetoresistive read element of a read/write head, the method comprising:
    providing first and second magnetoresistive read elements on the read/write head;
    dimensioning the second magnetoresistive read element in proportion to the first magnetoresistive read element;
    positioning the second magnetoresistive read element in proximity to the first magnetoresistive read element, wherein the second magnetoresistive read element remains in proximity with the first magnetoresistive read element after dicing;
    whereby a voltage resulting from an operation on the second magnetoresistive read element is representative of a voltage that would be detected if the same operation were performed upon the first magnetoresistive read element.

17. The method of claim 16 wherein the first and second magnetoresistive read elements each possess a top edge, and wherein the top edges of the first and second magnetoresistive read elements are collinear.

18. The method of claim 16 wherein the second magnetoresistive read element is the same size as the first magnetoresistive read element.

19. The method of claim 16 wherein the first magnetoresistive read element is interposed between a first pair of conductors, and wherein the second magnetoresistive read element is interposed between a second pair of conductors, the first and second pairs of conductors being dimensioned so as to have approximately identical impedances.

20. The method of claim 16 further comprising providing first and second magnetic shields and orienting the first and second the magnetoresistive read elements between the first and second magnetic shields.

* * * * *